(12) United States Patent
Clark et al.

(10) Patent No.: US 11,507,389 B2
(45) Date of Patent: Nov. 22, 2022

(54) ADJUSTING SETTINGS ON COMPUTING DEVICES BASED ON LOCATION

(71) Applicant: HEWLETT-PACKARD DEVELOPMENT COMPANY, L.P., Houston, TX (US)

(72) Inventors: Alexander Wayne Clark, Houston, TX (US); Kent E. Biggs, Houston, TX (US); Qian Lin, Palo Alto, CA (US); Madhu Sudan Athreya, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1129 days.

(21) Appl. No.: 16/078,369

(22) PCT Filed: Sep. 29, 2016

(86) PCT No.: PCT/US2016/054431
§ 371 (c)(1),
(2) Date: Aug. 21, 2018

(87) PCT Pub. No.: WO2018/063243
PCT Pub. Date: Apr. 5, 2018

(65) Prior Publication Data
US 2021/0191735 A1 Jun. 24, 2021

(51) Int. Cl.
*G06F 9/4401* (2018.01)
*G06F 3/16* (2006.01)
(Continued)

(52) U.S. Cl.
CPC ............ *G06F 9/4411* (2013.01); *G06F 3/165* (2013.01); *G06V 20/10* (2022.01); *G06V 40/161* (2022.01);
(Continued)

(58) Field of Classification Search
CPC ......... H04M 1/72454; H04M 1/72457; H04W 4/02; H04L 67/306; G06V 20/10; G06V 40/161
See application file for complete search history.

(56) References Cited

U.S. PATENT DOCUMENTS 7,983,920 B2   7/2011   Sinclair
8,660,581 B2   2/2014   Davis et al.
(Continued)

FOREIGN PATENT DOCUMENTS

CN    101286058    10/2008
CN    101849404     9/2010
(Continued)

OTHER PUBLICATIONS

"6 Android Apps to Adjust Screen Brightness Settings", XSLab, Retrieved from internet—http://xslab.com/2014/07/6-android-apps-to-adjust-screen-brightness-settings/, Jul. 5, 2014, 8 Pages.

*Primary Examiner* — Priyank J Shah
(74) *Attorney, Agent, or Firm* — HP Inc. Patent Department

(57) ABSTRACT

Examples disclosed herein provide the ability for a computing device to adjust settings on a computing device. In one example method, the computing device captures, via a first sensor of a computing device, images of an environment that the computing device is currently in, and detects objects in the environment as captured by the images. As an example, the computing device determines a location of the environment based on contextual data gathered from the detected objects and adjusts a setting on the computing device based on the determined location.

20 Claims, 3 Drawing Sheets

(51) Int. Cl.
*G09G 3/22* (2006.01)
*G06V 20/10* (2022.01)
*G06V 40/16* (2022.01)

(52) U.S. Cl.
CPC ....... *G09G 3/22* (2013.01); *G09G 2320/0626* (2013.01)

(56) References Cited

U.S. PATENT DOCUMENTS

| | | | |
|---|---|---|---|
| 8,958,828 | B2 | 2/2015 | Zheng |
| 9,326,149 | B2 | 4/2016 | Hassan et al. |
| 2003/0148773 | A1 | 8/2003 | Spriestersbach et al. |
| 2004/0075589 | A1 | 4/2004 | Wang et al. |
| 2008/0146255 | A1 | 6/2008 | Gopalakrishnan et al. |
| 2008/0297586 | A1 | 12/2008 | Kurtz et al. |
| 2010/0075652 | A1 | 3/2010 | Keskar et al. |
| 2010/0159908 | A1 | 6/2010 | Chang et al. |
| 2011/0148922 | A1 | 6/2011 | Son et al. |
| 2012/0115453 | A1* | 5/2012 | Zheng ................... H04W 4/185 455/418 |
| 2015/0094118 | A1* | 4/2015 | Rodolico ............... G06V 40/20 455/566 |
| 2015/0169053 | A1* | 6/2015 | Bozarth ................ G06F 1/3234 345/156 |
| 2016/0094814 | A1 | 3/2016 | Gousev et al. |
| 2016/0205238 | A1* | 7/2016 | Abramson ......... G01C 21/3484 455/456.4 |
| 2016/0248505 | A1 | 8/2016 | Cha et al. |
| 2017/0048611 | A1* | 2/2017 | Wu ....................... H04R 1/345 |

FOREIGN PATENT DOCUMENTS

| | | |
|---|---|---|
| CN | 102364893 | 2/2012 |
| CN | 102883104 | 1/2013 |
| CN | 103312796 | 9/2013 |
| CN | 103430604 | 12/2013 |
| WO | 2011116309 A1 | 9/2011 |
| WO | 2016022008 A1 | 2/2016 |
| WO | WO-2016108660 | 7/2016 |

\* cited by examiner

ADJUSTING SETTINGS ON COMPUTING DEVICES BASED ON LOCATION

BACKGROUND

The emergence and popularity of mobile computing has made portable computing devices, due to their compact design and light weight, a staple in today's marketplace. Computing devices, such as notebook computers, tablet computers, and smartphones, generally include a display member and speakers that are utilized to provide an immersive audio/video experience. In addition, the computing devices may have antennas to connect to various wireless technology standards, such as Wi-Fi and Bluetooth.

DETAILED DESCRIPTION

Due to their compact design and light weight, computing devices, such as notebook computers, tablet computers, and smartphones, may be used in various environments, and for various purposes (e.g., work or personal use). Examples of different environments that a computing device may be used in include at work, a public environment, and at home. Based on the environment that the computing device is being used in at a particular moment, the user may prefer to have certain settings on the computing device modified, or even enabled or disabled. Examples of such settings may relate to the audio/video components of the computing device, such as the speakers or display member, or settings regarding the antennas for connecting to the various wireless technology standards.

Examples disclosed herein provide the ability to automatically adjust settings on a computing device, based on the location or environment that the computing device is in at a particular moment in time. As the location or environment that the computing device is in changes, settings on the computing device may automatically adjust, based on user preferences at that particular location. As an example, once the computing device detects that it is being used in a public environment, a privacy filter may be automatically enabled on the display member, in order to ensure the privacy of what is being displayed. Also, based on the location that the computing device is detected to be in, contextually-relevant data may automatically be provided on the display member of the computing device, as will be further described. By automating such processes on the computing device based on the location that the computing device is in, rather than requiring a user to remember to adjust settings, user productivity may increase and enforcement of privacy in public environments may be automated.

Figure 1:
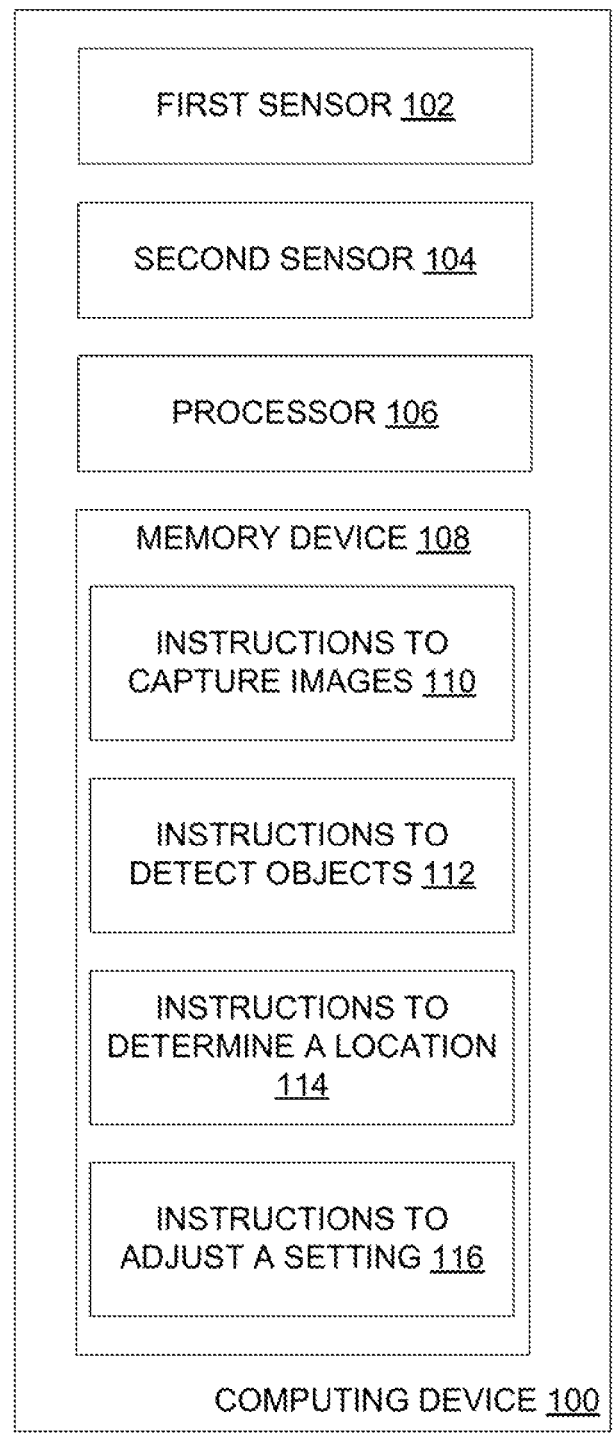
FIG. 1 illustrates a computing device for adjusting settings on the computing device, based on a current location of the computing device, according to an example.

With reference to the figures, FIG. 1 illustrates a computing device 100 for adjusting settings on the computing device 100, based on a current location of the computing device 100, according to an example. The computing device 100 includes a first sensor 102 and/or a second sensor 104 that may be used separately or in combination for detecting the current location of the computing device 100, by gathering contextual data collected by the sensors 102, 104, as will be further described. As an example, the first sensor 102 may be used for capturing images, such as an RGB camera or infrared (IR) camera, for capturing images of an environment that the computing device 100 is currently in. As an example, the second sensor 102 may be used for listening for sound patterns and frequencies, such as a microphone. As will be further described, sensors on the computing device 100 may be used to determine the environment that the computing device 100 is in, by detecting known objects, both visual and audio. As an example, through a process running in the background, this object detection data may be used to adjust settings on the computing device 100, according to determined location profiles. Examples of settings that may be adjusted include privacy screen settings, audio settings, screen brightness, and Bluetooth pairing, as will be further described.

The computing device 100 depicts a processor 106 and a memory device 108 and, as an example of the computing device 100 performing its operations, the memory device 108 may include instructions 110-116 that are executable by the processor 106. Thus, memory device 108 can be said to store program instructions that, when executed by processor 106, implement the components of the computing device 100. The executable program instructions stored in the memory device 108 include, as an example, instructions to capture images (110), instructions to detect objects (112), instructions to determine a location (114), and instructions to adjust a setting (116).

Instructions to capture images (110) represent program instructions that when executed by the processor 106 cause the computing device 100 to capture, via the first sensor 102, images or video of an environment that the computing device 100 is currently in. As an example, the first sensor 102 may be an RGB or IR camera on the computing device 100 for capturing the images or video of the environment in front of or around the computing device 100.

Instructions to detect objects (112) represent program instructions that when executed by the processor 106 cause the computing device 100 to detect objects in the environment, as captured by the images. As an example, each image or frame of captured video may be processed using object detection algorithms for various objects of interest, as will be further described. In order to promote efficiency, these objects may be detected using Viola-Jones methodology, as an example, of cascade classifiers to ensure that image processing is real-time, fast, and not computationally taxing on the processor 106. However, other forms of object detection may be implemented as well. For example, a deep learning approach may be useful for more advanced object detection. As an example, neuromorphic architectures are driving power efficiency for deep learning, so a hybrid approach could possibly be implemented as well, using various object detection algorithms in combination. In order to address privacy concerns of the first sensor 102 capturing the environment around the computing device 100, the object detection algorithms may analyze the images for objects upon capture, and then delete the images, rather than saving or storing them to be analyzed later. As a result, the only data captured are the types of objects detected via the object detection algorithms.

Instructions to determine a location (114) represent program instructions that when executed by the processor 106 cause the computing device 100 to determine a location of the environment captured by the first sensor 102, based on contextual data gathered from the detected objects described above. Different types of objects can be detected that can provide clues to the kind of environment that the computing device 100 is in. For example, if airplane seats are detected, as airplane seats may be distinctive and common in nature, the airplane seats may provide contextual data that the computing device 100 is being used by a user aboard an aircraft. Similarly, if tables and chairs are detected, furniture such as chairs and tables can be trained to provide contextual data that the computing device 100 is likely being used by the user in a café or restaurant. Also, if trees and plants are detected, different kinds of trees and plants could be trained to indicate that the computing device 100 is likely being used by the user in an outdoor setting (e.g., somewhere in nature). As an example, if cubicle panels are detected, various types of standardized cubicles could be trained to indicate that the computing device 100 is likely being used by the user in a cubicle setting (e.g., at work).

The threshold for determining whether the computing device 100 is at a particular location may vary. For example, the number of objects required to determine whether the computing device 100 is currently being used in an airport may vary from the number of objects required to determine whether the computing device 100 is currently being used in a restaurant. In addition to having pre-determined categories for determining where the computing device 100 is currently being used, such as the categories mentioned above (e.g., aircraft, restaurant, outdoor setting, or at work), some environments captured by the first sensor 102 may not fall into any of the pre-determined categories. Instead, as the computing device 100 is detecting objects, as described above, the computing device 100 may keep a log of the types of objects, relative location of those objects, and number of those objects. If a user is found to be constantly and repeatedly using the computing device 100 in that environment, then a category may be dynamically created for the new environment.

When gathering contextual data from the objects detected, in order to determine a location of the environment captured by the first sensor 102, the computing device 100 may take into consideration the scenes that the objects are captured in. As an example, the scenes correspond to a combination of the objects captured and their surroundings, as captured by the first sensor 102. By considering how the detected objects are arranged relative to each other in a scene, a more accurate assessment of the location may be provided. Referring to the example above, regarding the detection of an airplane seat, although airplane seats may be distinctive and common in nature, if only one airplane seat is detected, or if multiple airplane seats are detected, but not arranged in a way normally found in an aircraft, the computing device 100 may determine that it is not in an aircraft. However, when considering the scene that the objects are captured in, if an arrangement of airplane seats are detected, as normally found in an aircraft, the computing device 100 may determine that it is in an aircraft.

Instructions to adjust a setting (116) represent program instructions that when executed by the processor 106 cause the computing device 100 to adjust a setting on the computing device 100, based on the determined location. As an example, once the images captured by first sensor 102 are used to detect objects and determine a location that the computing device 100 is likely being used in by a user, the computing device 100 could automatically adjust settings with regards to lock policies, privacy screen, audio settings, display brightness, and Bluetooth device settings, among others. With regards to lock policies, security policies may be dynamically modified using the determined location. For example, the computing device 100 can be changed to lock more quickly if the determined location is an airplane or café, and to lock slower if the determined location is at home or in a cubicle (e.g., at work). With regards to privacy screens, if the determined location is a public environment, such as an airplane or café, the privacy screen may be dynamically invoked. However, in more private environments, such as at home or in a cubicle, use of the privacy screen may not be necessary and, therefore, automatically disabled.

With regards to audio settings, audio output changes can be automatically made, based on the location the computing device 100 is determined to be in at a particular moment in time. For example, audio settings can be automatically tuned and adjusted to suit the type of environment the computing device 100 is currently in. With regards to display brightness, as an example, if the currently determined location of the computing device 100 is noted to be outdoors, then the brightness of the screen may be automatically raised, so that the content of the screen can be seen. This automatic adjustment of the brightness could be used instead of an ambient light sensor. With regards to Bluetooth device settings, there may be some devices and components that a user may only use in a particular environment. As a result, based on the determined location of the computing device 100, the computing device 100 may automatically pair to a set of devices specific to the determined location. For example, a user may prefer for the computing device 100 to automatically pair with a Bluetooth headset while in their cubicle, but then to automatically pair to a Bluetooth speakerphone when the computing device 100 is determined to be in a conference room, even if the users Bluetooth headset is on their possession or in range while the user is in the conference room.

In addition to detecting a general environment that the computing device 100 is currently being used (e.g., aircraft, café, outdoors, or at work), some objects detected by the environment captured by the first sensor 102 may correspond to logos of known companies, stores, and/or restaurants, providing an indication that the computing device 100 is likely being used by a user in a location belonging to a particular company. As a result, data may be displayed on a screen of the computing device, corresponding to the particular company. For example, a specific café or restaurant could push appropriate data to the computing device 100, such as quick links to place orders or easy access to applicable coupons. Airports, as another example, could push flight times and scheduling, as well as announcements.

As an example, a setting of the computing device 100 that is to be adjusted based on its determined location, may be part of a profile of settings of the computing device 100 that corresponds to the determined location. For example, when the determined location where the computing device 100 is currently being used indicates a restaurant, in addition to enabling the privacy screen, the audio settings may be adjusted as well. Each location may have a unique profile of settings to be adjusted. For example, the following locations may have their own unique profile of settings that need to be adjusted: airport, café/restaurant, cubicle, conference room, and home. With regards to detecting logos of a particular company, as described above, more specific profiles can exist and be configured by such companies.

As mentioned above, a second sensor 104 may be used separately or in combination with the first sensor 102 for detecting the current location of the computing device 100. As an example, the second sensor 104 may capture ambient noise from the environment that the computing device 100 is currently in. Prior to adjusting a setting on the computing device 100, the computing device 100 may determine whether the captured ambient noise corresponds to the location determined from the contextual data provided by the objects captured by the first sensor 102, as described above.

As an example, the second sensor 104 may correspond to a microphone on the computing device 100, and the microphone can be listening for known sound patterns and frequencies. The processor 106 can match the incoming audio stream with defined audio entities. This signal processing can be a relatively simple threshold comparison or employ deep learning as well. The ambient noise collected may be unique to a particular location and correspond to the location determined from the contextual data provided by the objects captured by the first sensor 102. As an example, airports have periodic announcements and commercials over the loudspeakers. Similarly, restaurants and stores also may have specific advertisements over their radio. All of these known entities can be used to determine the type of environment the device is in, and whether the noise collected corresponds to the location determined from the contextual data provided by the objects captured by the first sensor 102.

In addition to detecting objects in the environment that the computing device 100 is currently in, the computing device 100 may determine whether objects detected correspond to human faces. As will be further described in FIG. 2, a computing device may adjust its settings based on the detection of faces, including the number of faces detected, their proximity to the device, and their orientation with respect to the device (e.g., whether or not the faces are directing their attention to the screen of the computing device).

Memory device 108 represents generally any number of memory components capable of storing instructions that can be executed by processor 106. Memory device 108 is non-transitory in the sense that it does not encompass a transitory signal but instead is made up of at least one memory component configured to store the relevant instructions. As a result, the memory device 108 may be a non-transitory computer-readable storage medium. Memory device 108 may be implemented in a single device or distributed across devices. Likewise, processor 106 represents any number of processors capable of executing instructions stored by memory device 108. Processor 106 may be integrated in a single device or distributed across devices. Further, memory device 108 may be fully or partially integrated in the same device as processor 106, or it may be separate but accessible to that device and processor 106.

In one example, the program instructions 110-116 can be part of an installation package that when installed can be executed by processor 106 to implement the components of the computing device 100. In this case, memory device 108 may be a portable medium such as a CD, DVD, or flash drive or a memory maintained by a server from which the installation package can be downloaded and installed. In another example, the program instructions may be part of an application or applications already installed. Here, memory device 108 can include integrated memory such as a hard drive, solid state drive, or the like.

Figure 2:
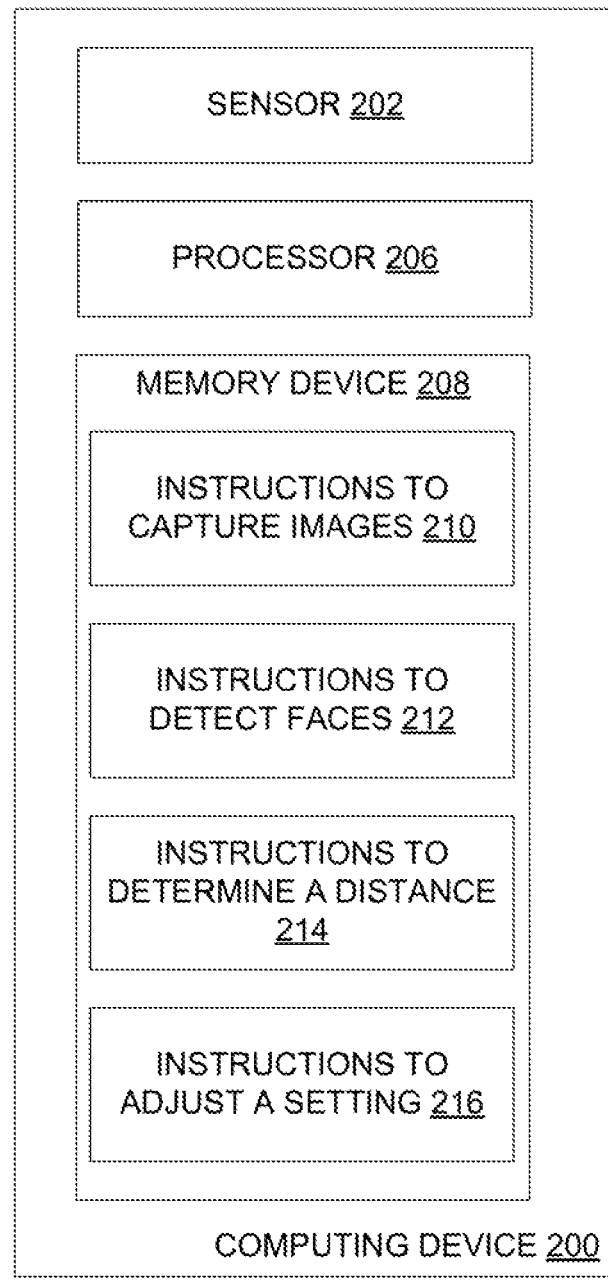
FIG. 2 illustrates a computing device for adjusting settings on the computing device, according to an example.

FIG. 2 illustrates a computing device 200 for adjusting settings on the computing device 200, according to an example. The computing device 200 includes a sensor 202, which may correspond to the first sensor 102 of computing device 100. As an example, the sensor 202 may be used for capturing images, such as an RGB camera or infrared (IR) camera, for capturing images of an environment that the computing device 100 is currently in. In addition to using sensors on the computing device 200 to determine the environment that the computing device 200 is in, similar to operations performed by computing device 100, the computing device 200 may determine whether objects detected correspond to human faces. As an example, through a process running in the background, settings on the computing device 200 may be adjusted, based on whether the objects detected correspond to human faces.

Similar to the processor 106 and memory device 108 of computing device 100, the computing device 200 depicts a processor 206 and a memory device 208 and, as an example of the computing device 200 performing its operations, the memory device 208 may include instructions 210-216 that are executable by the processor 206. Thus, memory device 208 can be said to store program instructions that, when executed by processor 206, implement the components of the computing device 200. The executable program instructions stored in the memory device 208 include, as an example, instructions to capture images (210), instructions to detect faces (212), instructions to determine a distance (214), and instructions to adjust a setting (216).

Instructions to capture images (210) represent program instructions that when executed by the processor 206 cause the computing device 200 to capture, via the sensor 202, images or video of an environment that the computing device 200 is currently in. As an example, the sensor 202 may be an RGB or IR camera on the computing device 200 for capturing the images or video of the environment in front of or around the computing device 200.

Instructions to detect faces (212) represent program instructions that when executed by the processor 206 cause the computing device 200 to determine whether there are faces captured in the images. Similar to instruction 112 of computing device 100, each image or frame of captured video may be processed using object detection algorithms for determining whether there are faces captured in the images. In order to address privacy concerns of the sensor 202 capturing the environment around the computing device 200, the object detection algorithms may analyze the images for objects upon capture, and then delete the images, rather than saving or storing them to be analyzed later. As a result, the only data captured is information regarding any faces captured in the images.

As an example, determining whether there are any faces detected in the environment surrounding the computing device 200 may impact the settings to be adjusted on the computing device 200. As will be further described, information regarding any faces captured in the images may be used to determine the settings to be adjusted on the computing device 200. Examples of information that may be collected from what is captured by sensor 202 include the number of faces detected, their proximity to the computing device 200, and their orientation with respect to the device (e.g., whether or not the faces are directing their attention to the screen of the computing device). With regards to the number of faces detected, knowing how many people are around the computing device 200 can be valuable information for determining the environment that the computing device 200 is currently in.

Instructions to determine a distance (214) represent program instructions that when executed by the processor 206 cause the computing device 200 to determine a distance of any faces detected from the computing device 200. With regards to the proximity of faces detected to the computing device 200, it may be useful to determine the hearing and eyesight range of those in the environment surrounding the computing device 200, in order to adjust settings accordingly, as will be further described. As an example of determining the distance of the faces detected, a distance between speakers of the computing device 200 and ears of the faces detected, and/or a distance between a screen of the computing device 200 and eyes of the faces detected may be estimated. Each face detected may have their own distance from the computing device 200 estimated. As an example, the distance can be estimated using the size of each face and camera parameters when there is a 2D imaging sensor, or from depth map when there is a 3D imaging sensor.

Instructions to adjust a setting (216) represent program instructions that when executed by the processor 206 cause the computing device 200 to adjust a setting on the computing device 200, based on the distance of the faces from the computing device 200. With regards to determining the hearing and eyesight range, as described above, the computing device 200 may automatically adjust the volume of the speakers based on the distance of the faces from the computing device 200. Similarly, the computing device 200 may automatically adjust a brightness of the screen and/or a size of text on the screen, based on the distance of the faces from the computing device 200. As an example, the settings adjusted may be based on an average of the distances of the faces detected, a minimum distance, or a maximum distance.

As an example, with regards to ensuring that information provided on the screen of the computing device 200 is within eyesight range of faces detected around the computing device 200, the computing device 200 may ensure whether a focus of at least one of the faces detected is directed towards the screen of the computing device 200, prior to adjusting a brightness of the screen and/or a size of text on the screen. If it is detected that none of the faces are directing their focus to the computing device 200, only the audible range of the computing device 200 may be automatically adjusted, in order to ensure that those around the computing device 200 can hear what is being played on the computing device 200.

Figure 3:
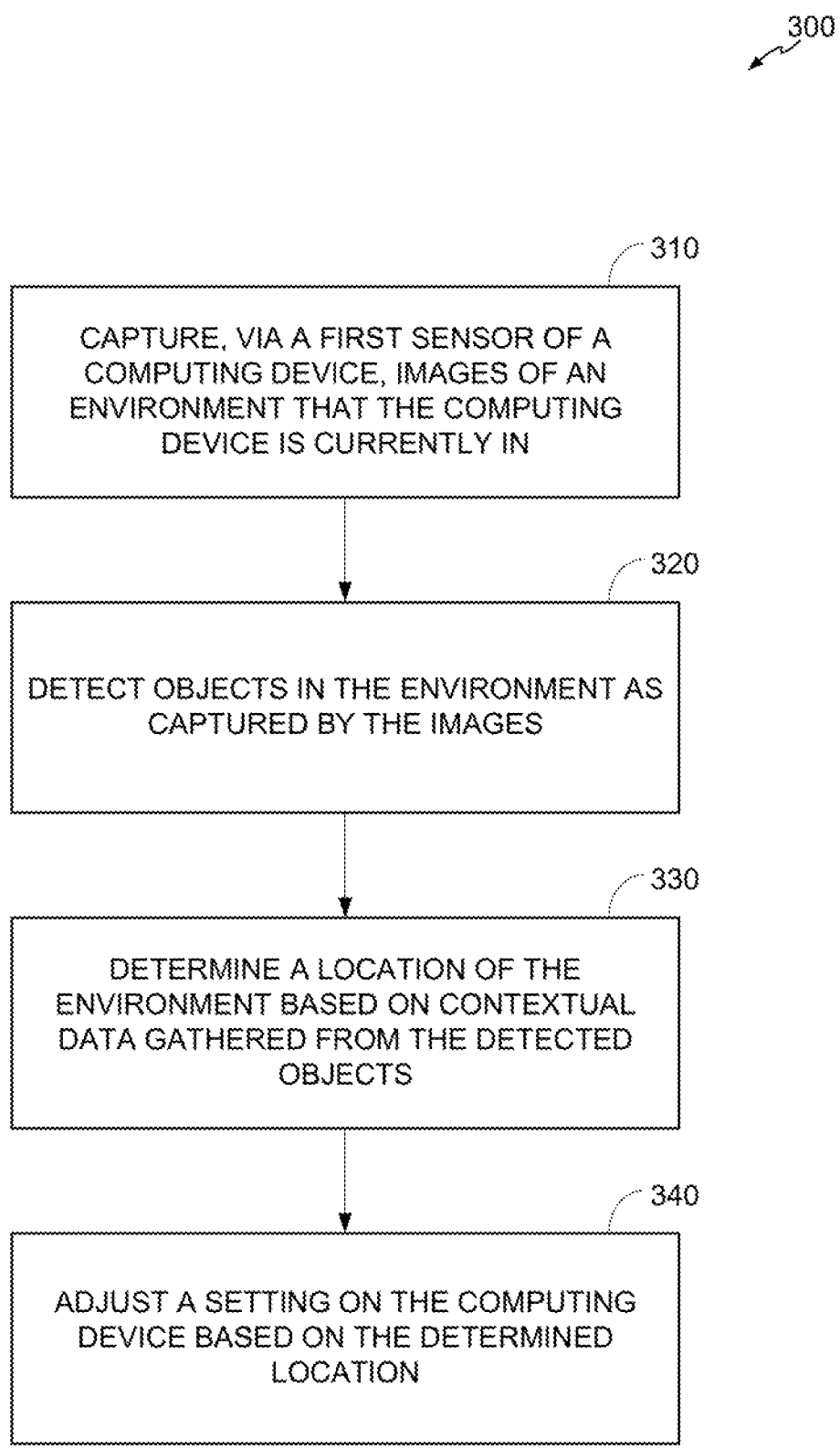
FIG. 3 is a flow diagram in accordance with an example of the present disclosure.

FIG. 3 is a flow diagram 300 of steps taken by a computing device to implement a method for adjusting settings on the computing device, based on a current location of the computing device, according to an example. In discussing FIG. 3, reference may be made to the example computing devices 100, 200 illustrated in FIGS. 1 and 2, respectively. Such reference is made to provide contextual examples and not to limit the manner in which the method depicted by FIG. 3 may be implemented.

At 310, the computing device captures, via a first sensor of the computing device, images of an environment that the computing device is currently in. As an example, the first sensor may be an RGB or IR camera on the computing device for capturing the images or video of the environment in front of or around the computing device. At 320, the computing device detects objects in the environment as captured by the images. As described above, each image or frame of captured video may be processed using object detection algorithms for various objects of interest. Similar to computing device 200, the computing device may determine whether the objects detected correspond to human faces.

At 330, the computing device determines a location of the environment based on contextual data gathered from the detected objects. As described above, different types of objects can be detected that can provide clues to the kind of environment that the computing device is in. As an example, the detected objects may belong to pre-determined categories that provide the contextual data for determining the location of the environment. However, some environments captured by the first sensor may not fall into any of the pre-determined categories. Instead, as the computing device is detecting objects, the computing device may keep a log of the types of objects, relative location of the objects, and number of those objects. If a user if found to be constantly and repeatedly using the computing device in that environment, then a category may be dynamically created for the new environment. As an example, the contextual data gathered from the detected objects may be determined by considering in combination the detected objects and scenes that correspond to an arrangement of the objects captured and their surroundings.

At 340, the computing device adjusts a setting on the computing device based on the determined location. As an example, once the images captured by first sensor are used to detect objects and determine a location that the computing device is likely being used in by a user, the computing device could automatically adjust settings with regards to lock policies, privacy screen, audio settings, display brightness, and Bluetooth device settings, among others. The setting to be adjusted may be part of a profile of settings of the computing device that corresponds to the determined location. As an example, each location that can be determined based on the contextual data gathered from the detected objects may have a unique profile of settings to be adjusted.

In addition to the images captured by the first sensor, a second sensor of the computing device may capture ambient noise from the environment that the computing device is currently in. As an example, prior to the computing device adjusting a setting on the computing device based on the determined location, the computing device may determine whether the captured ambient noise corresponds to the determined location.

As an example, the computing device may display, on a screen of the computing device, data corresponding to the determined location. For example, in addition to detecting a general environment that the computing device is currently being used (e.g., aircraft, café, outdoors, or at work), some objects detected by the environment captured by the first sensor may correspond to logos of known companies, stores, and/or restaurants, providing an indication that the computing device is likely being used by a user in a location belonging to a particular company. As a result, data may be displayed on a screen of the computing device, corresponding to the particular company.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method comprising:
    capturing, using a first sensor of a computing device, images of an environment that the computing device is currently in;
    detecting objects in the environment as captured in the images;
    determining a location of the environment based on contextual data gathered from the detected objects;
    detecting faces in the images;
    determining, by the computing device, whether a focus of any of the faces is directed towards a display screen of the computing device; and
    adjusting, by the computing device, a setting of the computing device based on the determined location and the determining of whether the focus of any of the faces is directed towards the display screen, wherein the adjusting of the setting comprises adjusting an audio setting of the computing device in response to determining that none of the faces are directing their focus to the display screen.

2. The method of claim 1, comprising:
    capturing, using a second sensor of the computing device, ambient noise from the environment that the computing device is currently in; and
    prior to adjusting the setting on the computing device, determining whether the captured ambient noise corresponds to the determined location.

3. The method of claim 2, wherein the determining of whether the captured ambient noise corresponds to the determined location comprises matching the captured ambient noise to defined audio.

4. The method of claim 1, wherein the setting to be adjusted is part of a profile of settings of the computing device that corresponds to the determined location, wherein each location that can be determined based on the contextual data gathered from the detected objects is to have associated with a unique profile of settings to be adjusted.

5. The method of claim 1, comprising:
    displaying, on the display screen of the computing device, data corresponding to the determined location.

6. The method of claim 1, wherein the detected objects are to belong to pre-determined categories that provide the contextual data for determining the location of the environment.

7. The method of claim 1, wherein the contextual data gathered from the detected objects comprises scenes surrounding the detected objects, and wherein the determining of the location of the environment is based on the scenes.

8. The method of claim 1, comprising:
    determining distances of the faces from the computing device; and
    adjusting the setting further based on the determined distances.

9. The method of claim 8, comprising:
    in response to determining that the focus of at least one of the faces is directed towards the display screen, adjusting a brightness of the display screen and a size of text on the display screen, based on the determined distances.

10. The method of claim 1, further comprising:
    adjusting a privacy screen setting of the display screen based on the determined location and the determining of whether the focus of any of the faces is directed towards the display screen.

11. The method of claim 1, wherein the adjusting of the audio setting comprises adjusting a volume of speakers of the computing device.

12. A non-transitory computer-readable storage medium comprising instructions that upon execution cause a computing device to:
    receive images of an environment that the computing device is currently in, the images captured by a sensor of the computing device;
    detect faces in the images;
    determine whether a focus of any of the faces is directed towards a display screen of the computing device; and
    adjust a setting of the computing device based on the determining of whether the focus of any of the faces is directed towards the display screen, wherein the adjusting of the setting comprises adjusting an audio setting of the computing device in response to determining that none of the faces are directing their focus to the display screen.

13. The non-transitory computer-readable storage medium of claim 12, wherein the instructions upon execution cause the computing device to:
    determine distances of the faces from the computing device; and
    adjust the setting further based on the determined distances.

14. The non-transitory computer-readable storage medium of claim 13, wherein the instructions upon execution cause the computing device to:
    in response to determining that the focus of at least one of the faces is directed towards the display screen adjust a brightness of the display screen and a size of text on the display screen, based on the determined distances.

15. The non-transitory computer-readable storage medium of claim 12, wherein the instructions upon execution cause the computing device to:
    adjust a privacy screen setting of the display screen based on the determining of whether the focus of any of the faces is directed towards the display screen.

16. The non-transitory computer-readable storage medium of claim 12, wherein the adjusting of the audio setting comprises adjusting a volume of speakers of the computing device.

17. A computing device comprising:
    a display screen;
    a first sensor;
    a second sensor; and
    a processor to:
        receive images of an environment that the computing device is currently in, the images captured by the first sensor;
        detect objects in the environment as captured in the images;

determine a location of the environment based on contextual data gathered from the detected objects;

receive data of ambient noise from the environment, the data of the ambient noise captured by the second sensor;

determine whether the ambient noise corresponds to the determined location;

detect faces in the images;

determine whether a focus of any of the faces is directed towards the display screen of the computing device; and adjust a setting of the computing device in response to determining that the ambient noise corresponds to the determined location and the determining of whether the focus of any of the faces is directed towards the display screen, wherein the adjusting of the setting comprises adjusting an audio setting of the computing device in response to determining that none of the faces are directing their focus to the display screen.

18. The computing device of claim 17, wherein the setting to be adjusted is part of a profile of settings of the computing device that corresponds to the determined location, wherein each location that can be determined based on the contextual data gathered from the detected objects is associated with a unique profile of settings to be adjusted.

19. The computing device of claim 17, wherein the processor is to display, on the display screen, data corresponding to the determined location.

20. The computing device of claim 17, wherein the processor is to:

adjust a privacy screen setting of the display screen based on the determined location and the determining of whether the focus of any of the faces is directed towards the display screen.

* * * * *